United States Patent [19] [11] 4,055,585
Okamoto et al. [45] Oct. 25, 1977

[54] PREPARATION OF LIQUID TDI FOR COMPOSITIONS

[75] Inventors: Masahiro Okamoto; Makoto Nemoto, both of Kanagawa; Yushin Kataoka, Ehime; Yoshiharu Tokugawa, Hyogo, all of Japan

[73] Assignees: Sumitomo Chemical Company, Limited, Osaka; Nittetsu Chemical Industrial Co., Ltd., Tokyo, both of Japan

[21] Appl. No.: 680,391

[22] Filed: Apr. 26, 1976

Related U.S. Application Data

[62] Division of Ser. No. 470,098, May 15, 1974, Pat. No. 4,000,099.

[51] Int. Cl.$^2$ ................. C07C 118/02; C07C 119/048
[52] U.S. Cl. ....................... 260/453 SP; 260/453 PH
[58] Field of Search ................... 260/453 PH, 453 SP

[56] References Cited

U.S. PATENT DOCUMENTS

| 2,680,128 | 6/1954 | Slocombe et al. | 260/453 |
| 3,180,852 | 4/1965 | Pferschke et al. | 260/775 |

*Primary Examiner*—Dolph H. Torrence
*Attorney, Agent, or Firm*—Sughrue, Rothwell, Mion, Zinn and Macpeak

[57] ABSTRACT

A urethane composition comprising as a base compound a polyol and/or an isocyanate-reactive tar, and as a curing agent a liquid product of a toluene diisocyanate tar occurring as a by-product in the preparation of toluene diisocyanate obtained by dissolving or dispersing the toluene diisocyanate tar in an aromatic solvent having a boiling point at atmospheric pressure of at least 200° C and a method for producing the liquid toluene diisocyanate tar product.

3 Claims, No Drawings

PREPARATION OF LIQUID TDI FOR COMPOSITIONS

This is a division of application Ser. No. 470,098, filed May 15, 1974, now U.S. Pat. No. 4,000,099.

BACKGROUND OF THE INVENTION

1. Field of the Invention

This invention relates to a urethane composition comprising a base compound and, as a curing agent, a liquid product of a toluene diisocyanate tar. The invention also relates to a process for producing a liquid product of a toluene diisocyanate tar occurring as a by-product in the preparation of toluene diisocyanate, which comprises dissolving or dispersing the tar in a specific aromatic solvent.

2. Description of the Prior Art

Polyols have long been known as a base compound for obtaining urethane compositions, and in recent years, it has become clear that an isocyanate-reactive tar obtained from a tar occurring as a by-product in the synthesis of phenols through hydroperoxides (to be referred to hereinafter for brevity as "by-product tar") is quite superior as the base compound. Urethane compositions obtained from such base compounds and curing agents composed of isocyanate compounds have found a wide range of applications in, for example, paints, road-paving compositions, adhesives, foamed materials, or flooring materials. Examples of isocyanate compounds include toluene diisocyanate (TDI), xylylene diisocyanate, hexamethylene diisocyanate, diphenylmethane diisocyanate, an adduct of toluene diisocyanate and trimethylol propane, and high-molecular-weight polyisocyanates (prepolymers) obtained from these isocyanates. However, these isocyanate compounds are generally expensive, and especially when it is desired to obtain urethane compositions of excellent strength and chemical resistance, more expensive polyisocyanates are required. Accordingly, the resulting urethane compositions naturally become costly, and isocyanate compounds available at low cost have been greatly desired in order to utilize the superior properties of urethane compositions in an even wider range of applications.

It is known that in the production of toluene diisocyanate, a tar-like substance (to be referred to hereinafter simply as a toluene diisocyanate tar or TDI tar) inevitably occurs as a byproduct, and no method is known to utilize this by-product effectively. With increased production of toluene diisocyanate in recent years, several tens of thousands of tons of the TDI tar have been formed annually all over the world, and simply disposed of as industrial wastes. If this by-product could be effectively utilized, a wide range of utility would be found because of the reactivity of the isocyanate group contained in the material, and great economic advantages would accrue in substituting this material for expensive isocyanate compounds.

The properties of the TDI tar vary somewhat according to the difference in the manufacturing conditions employed in producing toluene diisocyanate (TDI). Generally, however, the TDI tar is a black brown solid which contains 10 to 30% by weight of free isocyanate groups (-NCO) and which is brittle at room temperature. When TDI tar is heated to a temperature of above 150° C, usually above 200° C, that is, above the softening point, the tar melts, and chages to a viscous liquid. When the viscous liquid is further heated to higher than 250° to 260° C, the isocyanate groups decompose and gases evolve. Furthermore, when allowed to stand in the air, the TDI tar undergoes changes with the passage of time as a result of the gradual reaction of the isocyanate groups with the moisture in the air.

A great problem in the production of TDI industrially is that no method for effectively utilizing the TDI tar is at present known, and the disposal of the enormous amount of the TDI tar is very complicated and costly. One method for disposing of the TDI tar is incineration. However, in this method, the TDI tar melts and adheres to the floor or bottom of the incinerator at the time of incineration, and various difficulties occur in handling it.

The effective utilization of TDI tar also means the utilization of NCO groups contained in the TDI tar. As stated above, the TDI tar has a very high softening point, and remains solid at temperatures which are usually employed for chemical reactions. Therefore, within this temperature range, the reactivity of the NCO groups is poor, and the reaction of the NCO groups with other substances such as polypropylene glycol or other polyols virtually does not proceed. On the other hand, in the solid form, the TDI tar cannot even be used as a briquet, a coking material, a pitch coke material, or a binder pitch for electrodes, etc. as in the case with coal tar pitch, because the TDI tar contains NCO groups.

Since TDI tar is solid at room temperature and has a softening point of as high as about 200° C, it has been impossible to liquefy the TDI tar, and this is the reason why the TDI tar has not been effectively used up to now. Merely heating the TDI tar only results in the forming of a viscous liquid of a viscosity which is not feasible to use and undesirable phenomena such as the evolution of decomposition gases occur. Furthermore, even when a solvent of the usually employed types is mixed with the TDI tar, the TDI tar is only swollen, or dissolved slightly in an amount of about several percent, and it has been completely impossible to obtain a uniform solution. For this reason, no practical utility for the TDI tar has been found.

It has now found that TDI tar is dispersible or soluble in specific aromatic solvents to convert the TDI tar in a liquid form (hereinafter liquid TDI tar), and that by combining such a liquid TDI tar as a curing agent with a polyol or isocyanate-reactive tar as a base compound, a urethane composition of superior properties can be obtained at low cost.

SUMMARY OF THE INVENTION

It is a primary object of this invention therefore to provide an inexpensive urethane composition comprising a base compound and, as a curing agent, a toluene diisocyanate tar in a liquid form.

Another object of this invention is to provide a process for producing a liquid product of a toluene diisocyanate tar, occurring as a by-product in the preparation of toluene diisocyanate, which comprises dissolving or dispersing the toluene diisocyanate tar in a specific aromatic solvent.

Accordingly, this invention provides a urethane composition comprising a. as a base compound, a polyol and/or an isocyanate-reactive tar obtained by reacting a tar occurring as a by-product in the hydroperoxide synthesis of phenols or a mixture of the tar with a phenol expressed by the general formula (I)

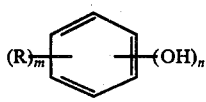

(I)

wherein R is an alkyl group containing 1 to 8 carbon atoms, m is an integer of 0 to 2, and n is an integer of 1 or 2, with formaldehyde in the presence of a basic catalyst, and (b) as a curing agent, a liquid toluene diisocyanate tar.

According to another aspect of this invention, the invention provides a process for producing toluene diisocyanate tar in a liquid form, which comprises pulverizing toluene diisocyanate tar in a substantially anhydrous condition in an aromatic solvent having a boiling point at atmospheric pressure of at least 200° C at a temperature below the softening point of the toluene diisocyanate tar; or which comprises mixing toluene diisocyanate tar in a substantially anhydrous condition with an aromatic solvent having a boiling point at atmospheric pressure of above 200° C at a temperature above the softening point of the toluene diisocyanate tar to dissolve the tar therein, or first mixing the tar with the solvent at a temperature below the softening point of the tar and then maintaining the mixture for at least 5 minutes at a temperature above the softening point of the tar.

DETAILED DESCRIPTION OF THE INVENTION

A very important feature of this invention is that a liquid TDI tar is used as a curing agent in the urethane composition of this invention. Accordingly, the production of the liquid TDI tar will first be described below.

The solvent used for obtaining the TDI tar in a liquid form is an aromatic solvent having a boiling point at atmospheric pressure of at least 200° C available, for example, as a mixture of aromatic compounds such as methyl naphthalene, dimethyl naphthalene, acenaphthene, fluorene, anthracene or phenanthrene. Suitable solvents are commercially available under the names of creosote oil, anthracene oil, pitch oil, methyl naphthalene oil, crystal-freed naphthalene oil or an absorbing or washing oil occuring in the coal tar industry. Cracked gasoline obtained in the cracking of naphtha in the petrochemical industry can also be used as a suitable solvent after being hydrogenated and distilled to collect fractions having a boiling point of above 200° C.

Other general solvents, for example, aromatic hydrocarbons such as benzene, toluene or xylene, ketones such as acetone or methyl ethyl ketone, chlorides such as methylene chloride or perchloroethylene, and esters such as ethyl acetate or butyl acetate do not dissolve the TDI tar at all or dissolve the TDI tar only slightly. Thus satisfactory results are not obtained. Furthermore, unsatisfactory results are obtained with naphthenic solvents and aliphatic solvents.

When the TDI tar is dispersed and suspended using the above-specified solvents, the resulting dispersion behaves as if it were a homogeneous solution, and separation and sedimentation of the TDI tar are not observed. However, when the above-mentioned general solvents are used, the TDI tar is temporarily dispersed, and soon separation and sedimentation are observed. Accordingly, a stable suspension is not formed, and the liquid cannot be handled when ordinary solutions are employed.

In the performance of the present invention, it is important to carry out the dissolution or dispersion under substantially anhydrous conditions. Since the free isocyanate group contained in the TDI tar reacts with water with gellation tending to occur, the solvent to be used should be thoroughly dried, and contact of the solvent with water should be avoided even during dissolving or pulverizing.

The method for obtaining liquid TDI tar is described below.

1. When the TDI tar is pulverized in the solvent to form a dispersion:

The pulverizer which can be used in pulverization is one suitable for pulverizing the TDI tar to a size of several to several tens of microns, and ball mill, a disc mill or a colloid mill can be used. In pulverization, sufficient care should be taken to avoid contact with water. The pulverization temperature is a temperature at which the TDI tar is a solid, that is, below the softening point of the tar. It is not particularly necessary to heat or cool the tar, and the tar can be pulverized at temperatures near room temperature without any consequent problem. The time required for pulverization differs according to the properties of the tar, the solvent used, and the capacity of the pulverizer used, but can be determined by observing the condition of dispersion and suspension of the TDI tar. Usually, the time ranges from about 1 to 10 hours.

With respect to the concentration of the liquid product of the TDI tar, a 50% by weight liquid comprising equal amounts of the TDI tar and the solvent can be produced. However, when the liquid has a high concentration, viscosity of the liquid is high, and it is difficult to handle the liquid. A concentration advantageous for practical purposes is about 10 to 40% by weight. A liquid with this concentration can be produced by pulverizing the TDI tar in a solvent in about 1.5 to 9 times by weight of the solvent to the weight of the tar.

2. When the TDI tar is mixed with the solvent to form a solution:

In performing this method, the dissolving temperature is particularly important.

When the aromatic solvent used in this invention is dried and then mixed with the TDI tar at a temperature below the softening point of the tar, the TDI is quite insoluble in the solvent. Even when the tar is soluble in the solvent, the rate of dissolution is very slow, and in order to obtain solutions of commercially feasible concentrations, very long periods of time are required. Thus, such a method cannot be performed commercially.

In contrast, when in accordance with the present invention, TDI tar pulverized to a stirrable size is poured into the aromatic solvent held at a temperature above the softening point (usually 200° C) of the TDI tar, and the tar and solvent are mixed with stirring, or when the TDI tar is poured into the solvent at a temperature below the softening point, the temperature is increased to a point above the softening point, and then the mixture is maintained at this temperature for at least 5 minutes, the TDI tar is rapidly dissolved in the solvent, and the solubility of the tar is also very high.

When the solution obtained by the above method is cooled to room temperature, the solution does not separate into two phases, nor is a solid substance precipitated. If contact with moisture is avoided, the resulting solution can be stored for quite long periods of time. Accordingly, it is commercially advantageous to withdraw the TDI tar in a molten condition from the TDI producing apparatus, and directly leading the TDI tar into the aromatic solvent maintained at a temperature above the softening point of the TDI tar, thereby to mix them with each other to form a solution.

The solubility of the TDI tar varies according to the properties of the TDI tar used. By treating at a temperature above the softening point, the TDI tar is soluble generally to an extent of about 1.5 times the weight of the solvent used, and consequently, a solution of the TDI tar of a concentration of about 50 to 60% by weight can be obtained. However, since in many cases, the solutions become at room temperature at such concentrations, solutions of a concentration of about 10 to 40% by weight which have suitable flowability at room temperature are commercially advantageous.

The resulting TDI tar suspensions or solutions can be used in various application by utilizing the reactivity of the isocyanate groups contained therein. Since these TDI tar suspensions or solutions have superior reactivity with active hydrogen-containing compounds such as those compounds containing hydroxyl, amino or thiol groups, polymeric compounds having superior weatherability and corrosion resistance can be obtained by reacting the TDI tar with, for example, polyol compounds such as polypropylene glycol, or polyamino compounds such as aniline or formaldehyde condensates. By utilizing this reaction and if desired, by conjointly using known isocyanates, the TDI tar suspensions or solutions can be used for producing two-package paints, road-paving compositions, adhesives, foam materials, flooring materials and the like which have superior weatherability and corrosion resistance.

The base compound used for preparing the urethane compositions of this invention is the polyol and/or isocyanate-reactive tar described above.

The polyols can be those used conventionally for preparing urethane compositions, and examples of such polyols include polyethers comprising polyethylene glycol or polypropylene glycol, polyesters derived from polycarboxylic acids such as phthalic acid, adipic acid or maleic acid and polyhydric alcohols such as ethylene glycol, propylene glycol or glycerine, the reaction products formed between phenolic compounds and formaldehyde, and castor oil.

As previously stated, the isocyanate-reactive tar is a special tar having a high reactivity with an isocyanate, which is obtained by reacting tar occurring as a by-product in the synthesis of phenols through hydroperoxides (by-product tar) or a mixture of the tar with a phenol of the general formula (I) given hereinabove in the presence of a basic catalyst.

The synthesis of phenols through hydroperoxides means, for example, the synthesis of phenol by the cumene method, the synthesis of cresol by the cymene method, or the synthesis of resorcinol or hydroquinone from diisopropylbenzene. The by-product tar constitutes a high boiling component obtained after distilling off the intended phenol from the acid-decomposed product of hydroperoxide. The components of the by-product tar include, for example, acetophenones, α-methylstyrenes, or alkylphenols which are distillable, but the proportion of each of these distillable components is small, and most of the components are of unknown structures. The by-product tar also contains tar-like materials that cannot be distilled. In performing the reaction, the above by-product can be used in any desired mixing ratio. The by-product tar used can be a heavy oil component resulting after the distilling off of the phenols from the acid-decomposed product of hydroperoxide, or the residue remaining after the distilling off of the relatively low boiling components from the heavy oil, or an intermediate fraction, or a pitch-like substance resulting from distilling off the intermediate fraction.

Coal tar or coal tar pitch cannot be used as a raw material for the isocyanate-reactive tar, probably because such a material contains only a small amount of functional groups capable of reacting with formaldehyde. When coal tar or coal tar pitch is reacted with a formaldehyde in the presence of a basic catalyst, the resulting tar is not reactive with an isocyanate, or has only a low reactivity.

When the by-product tar is reacted with formaldehyde in the presence of a basic catalyst by further adding a phenol to the reaction system, an isocyanate-reactive tar having a higher reactivity with isocyanate can be obtained. This is presumably because the phenol added to the reaction system serves to increase the reactivity of the by-product tar with formaldehyde, and as a result, the hydroxyl group content of the isocyanate-reactive tar is increased.

The formaldehyde for obtaining the isocyanate-reactive tar can, for example, be commercially available paraformaldehyde or formalin. On the other hand, the basic catalyst includes, for example, sodium hydroxide, aqueous ammonia, and amines. The amines that can be used can be any of aliphatic or aromatic primary, secondary and tertiary amines, for example, triethyl amine, trimethyl amine, triethanol amine, diethyl amine, or benzyl amine.

Examples of phenols are phenol, cresol, xylenol, t-butyl phenol, octyl phenol, and resorcinol.

The amounts of the by-product tar, formaldehyde, basic catalyst, and phenol are optionally determined by considering the viscosity or softening point of the isocyanate-reactive tar to be obtained, or its reactivity, etc. A preferred amount of formaldehyde is about 2 to 25 parts by weight, as paraformaldehyde, per 100 parts by weight of the by-product tar. The amount of the base as the catalyst varies according to the desired rate of reaction, but a preferred amount is about 5 to 10 parts by weight for aqueous ammonia (28%) per 100 parts by weight of the by-product tar, and about 1 to 8 mol% for the amines based on the formaldehyde. When it is necessary to increase the reactivity of the isocyanate-reactive tar with isocyanate to a greater extent, a phenol can be added as mentioned above. The amount of the phenol can be varied according to the desired reactivity and viscosity of the isocyanate-reactive tar to be obtained. The phenol can be pre-mixed with the by-product tar, or the by-product tar, the phenol and the formaldehyde can be reacted simultaneously. On increasing the amount of the phenol to be added, the hydroxyl group content of the resulting tar increases, that is, the reactivity of the tar with an isocyanate increases, but at the same time, the viscosity of the tar composition tends to increase. Generally, therefore, the amount of the phenol is preferably not more than 25 parts by weight per 100 parts by weight of the by-product tar.

The reaction temperature for preparing the isocyanate-reactive tar is 50° to 140° C, preferably 80° to 120° C, and a suitable reaction time is 1 to 8 hours. After reaction, the water, catalyst and unreacted substances are removed by distillation at reduced pressure. The resulting isocyanate-reactive tar ranges from a viscous liquid to a solid having a softening point of above 100° C depending on the raw and the reaction conditions.

The polyol and the isocyanate-reactive tar can be used either alone or as a mixture in optional proportions.

Futhermore, the TDI tar as a curing agent in the composition of this invention can be used, if desired, together with other isocyanate compounds. So long as the curing agent contains the TDI tar, it is included within the scope of the present invention.

In addition to the base compounds and the curing agent, the urethane composition of this invention can further contain conventional additives for urethane compositions, such as various curing catalysts, fillers, diluents, solvents, drying agents, resins and bituminous substances.

Examples of curing catalysts are curing accelerators, for example, tertiary amines such as triethyl amine or organo-metallic compounds such as dibutyltin dilaurate, and curing retarders, for example, phenols or organic halogen compounds.

Examples of fillers are inorganic fillers such as talc, clay, mica, calcium carbonate, or siliceous sand, and coloring pigments such as red iron oxide, aluminum powder or carbon black.

Example of diluents include dioctyl phthalate, dibutyl phthalate, and aromatic high-boiling neutral oils such as creosote oil, anthracene oil or pitch oil.

Examples of solvents are aromatic hydrocarbons such as toluene or xylene, esters such as ethyl acetate or butyl acetate, ketones such as methyl ethyl ketone or methyl isobutyl ketone, and cellosolve acetate.

Examples of resins are coumarone resins, and petroleum resins.

The drying agents, can, for example, be calcined gypsum, and molecular sieves.

Examples of the bituminous substances include coal tar, coal tar pitch, cut back tar, asphalt, and coal digestion pitch.

The urethane composition of this invention can be prepared using the same procedure generally employed in the preparation of the conventional urethane compositions. For example, the polyol and/or isocyanate-reactive tar and if desired, additives are kneaded by a ball mill, a three roll mixer, a mixer, or a kneader to form a base composition. On the other hand, the liquid TDI tar is, if desired, mixed with a polyisocyanate or other additives to form a curing agent. The base composition is then mixed with the curing agent prior to use.

The urethane composition of this invention so obtained exhibits equal or superior properties to conventional urethane compositions obtained, for example, from polyols and isocyanates, and can be employed over a wide range of applications, such as for preparing weather-resistant and corrosion-resistant paints, road-paving compositions, skid proofing materials, protective materials for concrete surfaces, adhesives, repairing materials for concrete cracks, various sealing materials, foamed materials, and floor materials.

Since the present invention makes use of the TDI tar which has not previously been utilizable and has been difficult even to dispose of, the resulting urethane compositions are very inexpensive. As a result of this effective utilization, disposal of the TDI tar occurring as a by-product in the production of toluene diisocyanate is no longer needed. Thus, two long-pending problems have been simultaneously solved by the present invention, and the industrial significance of the present invention is extremely great.

The following Examples illustrate the present invention. All parts, percentages, ratios and the like in the Examples are by weight, unless otherwise indicated.

EXAMPLE 1

A. Preparation of Liquid TDI Tar:

A dried ball mill was charged with 700 parts of dried creosote oil and 300 parts of TDI tar, and TDI tar was pulverized for 4 hours at room temperature. The contents of the ball mill were then withdrawn to obtain a black brown liquid TDI tar having a TDI tar concentration of 30% and an isocyanate group content of 5.5%.

Substantially the same results were obtained when anthracene oil was used instead of the creosote oil.

B. Preparation of Isocyanate-reactive Tar:

100 parts of the tar occurring as a by-product in the synthesis of cresol by the cymene method, 10 parts of phenol, 10.7 parts of 84% paraformaldehyde and 1.2 parts of triethylamine were reacted at 110° C for 1 hour. The reaction product was then distilled at 110° C and 20 to 30 mmHg. An isocyanate-reactive tar having a viscosity at 25° C of 60 poises and a hydroxyl group content of 6.25% was obtained.

Using the resulting isocyanate tar, a base composition of the following formulation was prepared,

| Isocyanate-reactive Tar (OH 6.25%) | 25 parts |
| Diluent (creosote oil) | 65 parts |
| Refined Castor Oil | 15 parts |

Then, 7.5 parts of the above liquid TDI tar as a curing agent was added to 7.5 parts of the above base composition, followed by adding 85 parts of siliceous sand No. 4. These materials were thoroughly mixed in a mixer to form a resin mortar composition. The resulting resin mortar composition was spread in a thickness of 5 mm on a concrete surface on which a primer of 37.5 parts of the same base composition as described above, 37.5 parts of the curing agent (the liquid TDI tar product) and 25 parts of toluene had been coated in an amount of 100 g/m$^2$, and finished using a trowel. After a lapse of 24 hours, this mortar was almost completely cured.

EXAMPLE 2

A. Preparation of Liquid /TDI Tar:

700 parts of dried creosote oil was placed in a vessel provided with a stirrer and a thermometer, and heated. When the temperature of the liquid reached 220° C, 300 parts of TDI tar having a softening point of 200° to 210° C and an isocyanate group content of 19.8% was placed in the vessel. Then the mixture was stirred for about 20 minutes while maintaining the temperature at 220° to 225° C.

The contents of the vessel were withdrawn to form a black brown liquid TDI tar product having a TDI tar concentration of 30% and an isocyanate group content of 5.6%.

B. Preparation of Isocyanate-reactive Tar:

40 parts of tar occurring as a by-product in the synthesis or cresol by the cymene method 7.5 parts of 84% paraformaldehyde and 3.2 parts of 28% aqueous ammonia were reacted for about 3.5 hours under reflux, and then the reaction product was distilled at reduced pressure (210 mmHg) at 200° C to remove the water and the unreacted substances.

The resulting isocyanate-reactive tar had a hydroxyl group content of 4.0%.

Using the above liquid TDI tar product and the above isocyanate-reactive tar, a base composition and a curing agent were prepared according to the following formulations.

| Base Composition | |
|---|---|
| Isocyanate-reactive Tar | 65 parts |
| Refined Castor Oil | 10 parts |
| Creosote Oil | 24.7 parts |
| Catalyst (triethylamine) | 0.3 part |
| Curing Agent | |
| Liquid TDI Tar Product | 80 parts |
| Polyisocyanate (NCO 30%) | 10 parts |
| Creosote Oil | 10 parts |

The base composition and the curing agent were mixed in a weight ratio of 40:60 to form a urethane composition.

The urethane composition was coated on a cleaned concrete surface in an amount of 1.5 kg/m² using a rubber trowel. Then, an emery powder having a particle size of about 1 mm was scattered on the composition in an amount of 10 Kg/m², and the surface was rolled. After aging for 8 hours, the excess of the emery powder was recovered.

This skid-preventing pavement withstood the effects of the running of heavy vehicles, and exhibited superior skid-preventing effects.

EXAMPLE 3

A base composition and a curing agent of the following formulations were prepared.

| Base Composition | |
|---|---|
| Polyester-type Polyol (effective OH 5%) (Desmophen 1200, trade name, produced by Bayer AG) | 70 parts |
| Creosote Oil | 29.7 parts |
| Catalyst (triethylamine) | 0.3 part |
| Curing Agent | |
| Liquid TDI Tar Product Used in Example 1 | 80 parts |
| Polyisocyanate (NCO 30%) | 10 parts |
| Creosote Oil | 10 parts |

The base composition and the curing agent were mixed in a weight ratio of 35:65. Using the resulting urethane composition, a skid-preventing paving was formed in the same way as described in Example 2. After aging for 8 hours, the skid-preventing pavement withstood the effects of the running of heavy vehicles, and exhibited superior skid-preventing effects.

EXAMPLE 4

A dried ball mill was charged with 560 parts of dried creosote oil and 240 parts of TDI tar, and then the TDI tar was pulverized by rotating the ball mill for 4 hours at room temperature. After 4 hours, the rotation of the ball mill was stopped. The contents were withdrawn to obtain a black brown, slightly viscous liquid having a TDI tar concentration of 30% and an isocyanate group content of 5.4% in an amount of 794 parts. When this liquid TDI tar product was stored in such a condition that contact with moisture was avoided, the product was storable for a long period of time without sedimentation and separation of a solid or gellation occuring.

When a pitch oil was used instead of the creosote oil, substantially the same results were obtained.

EXAMPLE 5

495 parts of dried absorption oil was placed in a colloid mill, and then 165 parts of TDI tar was added. When the TDI tar was pulverized for about 2.5 hours at room temperature, a black brown liquid having viscosity at room temperature of about 20 poises and a TDI tar concentration of 25% was obtained.

EXAMPLE 6

Cracked gasoline obtained in the cracking naphtha was hydrogenated and distilled to obtain a fraction having a boiling point of 300° to 350° C at atmospheric pressure. 455 parts of this fraction was added to a ball mill, and then 245 parts of TDI tar was added. The tar was pulverized for about 5 hours at 60° C to form a black brown liquid having an isocyanate group content of 6.5%, a viscosity at 25° C of about 45 poises and a TDI tar concentration of 35%.

EXAMPLE 7

A vessel equipped with a stirrer and a thermometer was charged with 455 parts of creosote oil. With stirring, the mixture was heated. With an increase in temperature, the water contained in the solvent was vaporized. By blowing a small amount of dry air or nitrogen gas into the vessel, the water was removed from the system. When the temperature of the solvent reached 220° C, 195 parts of TDI tar having a softening point of 200° to 210° C and an isocyanate group content of 19.8% was poured into the vessel while maintaining the temperature of the liquid at about 220° C. After the pouring, the mixture was stirred for about 15 minutes at 200° to 225° C. Then, the mixture was cooled to room temperature to form 648 parts of a black brown, slightly viscous liquid having an isocyanate group content of 5.6%, a TDI tar concentration of 30%, and a viscosity at 40° C of 45 poises.

EXAMPLE 8

Cracked gasoline obtained by the cracking of naphtha was hydrogenated, and distilled to form a fraction having a boiling point of 300° to 350° C. 348 parts of this fraction was placed in the same vessel as used in Example 7, and with stirring, heated to 120° to 130° C. The inside of the vessel was slightly reduced in pressure to remove the water of the solvent. Then, 232 parts of TDI tar was poured into the solvent, and the temperature was further increased. The solution was maintained at 210° to 220° C for about 10 minutes, and then cooled to room temperature. 576 parts of a solution having a viscosity at 30° C of 55 poises and a TDI tar concentration of 40% was obtained.

EXAMPLE 9

510 parts of a washing oil having a boiling point of 220 to 300° C was placed in the same vessel as used in Example 7. The oil was heated with stirring, and dried in the same way as described in Example 7. After drying, the solvent was maintained at 200° C to 210° C with stirring, and 170 parts of TDI tar which had been heated to about 200° C and maintained in a molten condition was added dropwise over the course of about 15 minutes. After the addition, the solution was cooled to room temperature to form a black brown solution having an isocyanate group content of 5.2% and a TDI tar concentration of 25%.

While the invention has been described in detail and with reference to specific embodiments thereof, it will be apparent to one skilled in the art that various changes and modifications can be made therein without departing from the spirit and scope thereof.

What is claimed is:

1. A process for forming a liquid of a solid toluene diisocyanate tar by-product in the preparation of toluene diisocyanate, which comprises
   1.
   1-1. heating the toluene diisocyanate tar having a softening point of about 200° C or higher, at a temperature above the softening point of said toluene diisocyanate tar, or
   1-2. withdrawing the toluene diisocyanate tar having a softening point of about 200° C or higher, in a molten condition from the toluene diisocyanate producing apparatus, and then the molten toluene diisocyanate tar at a temperature above the softening point of said toluene diisocyanate tar in a substantially anhydrous condition with an aromatic solvent selected from the group consisting of creosote oil, anthracene oil, pitch oil, methyl naphthalene oil, crystal-freed naphthalene oil, absorbing oil, washing oil, and hydrogenated cracked gasoline having a boiling point of above 200° C, to form a solution of said toluene diisocyanate tar, 2. pulverizing the above-define toluene diisocyanate tar at a temperature below the softening point thereof to a stirrable size, and
   2-1. mixing the pulverized toluene diisocyanate tar at a temperature below the softening point thereof in a substantially anhydrous condition with the above-defined aromatic solvent to form a dispersion of said toluene diisocyanate tar, and then maintaining the temperature of the dispersion at a temperature above the softening point thereof for at least 5 minutes to form a solution of said toluene diisocyanate tar, or
   2-2. mixing the pulverized toluene diisocyanate tar at a temperature above the softening point thereof in a substantially anhydrous condition with the above defined aromatic solvent to form a solution of the toluene diisocyanate tar, or
   3. pulverizing the above-defined toluene diisocyanate tar at a temperature below the softening point thereof in a substantially anhydrous condition in the above-defined aromatic solvent to form a dispersion of said toluene diisocyanate tar.

2. The process according to claim 1, wherein said heating, pulverizing, and mixing are conducted at a temperature below the decomposition point of toluene diisocyanate contained in said toluene diisocyanate tar.

3. The process according to claim 1, wherein said liquid of said toluene diisocyanate tar is formed by using said aromatic solvent in an amount such that the concentration of said toluene diisocyanate tar in said aromatic solvent is about 10 to 40% by weight.

* * * * *

UNITED STATES PATENT AND TRADEMARK OFFICE
CERTIFICATE OF CORRECTION

PATENT NO. : 4,055,585

DATED : October 25, 1977

INVENTOR(S) : Masahiro OKAMOTO, et al

It is certified that error appears in the above-identified patent and that said Letters Patent are hereby corrected as shown below:

IN THE TITLE:

"FOR" should be -- TAR --

Signed and Sealed this

Twenty-first Day of March 1978

[SEAL]

Attest:

RUTH C. MASON
Attesting Officer

LUTRELLE F. PARKER
Acting Commissioner of Patents and Trademarks